United States Patent Office 3,682,868
Patented Aug. 8, 1972

3,682,868
PROCESS FOR THE MANUFACTURE OF ACRYLIC ACID COPOLYMER AND PRODUCT
Johannes Wollner, Kapellen Kreis Moers, Wolfgang Tietz, Hamburg-Harburg, and Wilhelm Neier, Homberg, Lower Rhineland, Germany, assignors to A.G. Rheinpreussen, Homberg, Germany
No Drawing. Filed May 21, 1970, Ser. No. 39,552
Int. Cl. C08f *15/00, 27/00*
U.S. Cl. 260—78.5 T      8 Claims

ABSTRACT OF THE DISCLOSURE

An acrylic acid-olefin copolymer having a chain strucure in which the units of acrylic acid-olefin alternate and a process for manufacturing said copolymer comprising contacting a maleic anhydride-olefin copolymer with an alkali metal hydroxide wherein the mole ratio of maleic anhydride moiety in the copolymer to said hydroxide is about 1:1 in the presence of water and in the absence of decarboxylation catalyst at a temperature between 120 and 300° C. acidifying the resultant mixture and recovering said copolymer therefrom.

BACKGROUND OF THE INVENTION

This invention relates to acrylic acid-olefin copolymers in which the acrylic acid moiety and olefin moiety alternately form the copolymer chain and to the manufacture thereof. These copolymers are useful in the preparation of lacquer resins and water soluble stoving varnishes.

Copolymerization of acrylic acid or acrylic acid derivatives with equi-molar quantities of an olefinic monomer such as styrene leads to the formation of copolymers in which the acrylic acid or its derivatives are statistically distributed over the polymer chain. So far it has not been possible to synthesize a copolymer in which the acrylic acid and the copolymer alternatively form the chain. Catalytic decarboxylation processes taught in the art such as in German Pat. Nos. 445,565; 1,179,929 and 1,195,297 respectively decarboxylate by (1) utilizing steam plus sodium and calcuim carbonates or oxides on standard carriers and a temperature of 250–500° C., (2) utilizing a catalytic combination of trialkylphosphine plus arsenic or antimony trialkylarsine or stilbene coupled with a catalytic accelerator and a temperature of 60–260° C. and (3) utilizing a surface of metal of high conductivity such as copper in the presence of catalytic decarboxylating agents such as an oxide of copper, cadmium or silver at a temperature of 300–750° C. These prior processes which are directed towards decarboxylating maleic and/or fumaric acid and derivative monomers can either not be applied to the contemplated polymer reactants or will lead to incomplete conversions.

The desirability of being able to prepare an acrylic acid-olefin copolymer wherein the chain structure alternately consists of the acrylic and olefin comonomers is the acrylic acid-olefin copolymer has a greater flexibility rendering it more crack resistant when functioning as a lacquer film.

SUMMARY OF THE INVENTION

We have discovered a method of converting a maleic anhydride-olefin copolymer under non-catalytic conditions to an acrylic acid-olefin copolymer wherein the chain structure alternately consists of an acrylic acid moiety and olefin moiety. Further, we have discovered a method of controlled decarboxylation whereby the resultant copolymer has a chain structure of essentially alternating monomers, i.e., an olefin moiety on the one hand and an acrylic moiety on the other. Our invention further encompasses the novel resultant copolymer.

DETAILED DESCRIPTION OF THE INVENTION

Specifically, the method of the invention comprises contacting a maleic anhydride-olefin copolymer characterized by the formula:

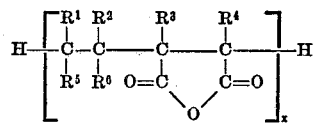

where $R^1$, $R^2$, $R^3$, $R^4$, $R^5$ and $R^6$ are hydrogen, alkyl or aryl of from 1 to 8 carbons and $x$ is an integer of from 5 to 50 with an alkali metal hydroxide, e.g., NaOH, or KOH in the presence of water and in the absence of decarboxylation catalyst at a temperature between about 120 and 300° C., preferably between 150–200° C., utilizing a mole ratio of alkali metal hydroxide to maleic anhydride moiety of about 1:1, preferably 1:1. The water content normally constitutes between about 10 and 50 wt. percent of the reaction mixture and the reaction time is normally for a period of between 1 and 5 hours. The resultant reaction mixture is then acidified to precipitate the copolymer and the copolymer is normally separated from the reaction mixture by filtration and purified, if desired, advantageously by washing. Examples of acidification agents are dilute aqueous mineral acid, e.g., hydrochloric, sulfuric, phosphoric and nitric acids of between about 1 and 10 wt. percent concentration. A suitable material for washing the precipitated polymer is water.

The product copolymer can be characterized by the formula:

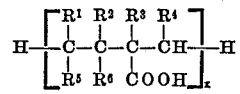

where $R^1$, $R^2$, $R^3$, $R^4$, $R^5$, $R^6$ and $x$ are as heretofore defined.

In further explanation of the process, as heretofore stated, it provides a simple way of producing copolymers of alternating chain structure from acrylic acid or its derivatives in other monomers, e.g., alkenes and substituted alkenes. According to the invention, the maleic anhydride olefin copolymers produced by standard means from maleic anhydride and olefin monomers, e.g., alkenes and substituted alkenes of from 2 to 8 carbons such as styrene, indene, isobutylene, alpha-methylstyrene and diisobutylene.

The copolymers thus obtained which are known to have alternating chain structures are converted to a solution of the monoalkali salt by the contact of the alkali metal hydroxide so that one carboxyl group remains free for each anhydride group. This contact is normally conducted in an autoclave type of apparatus to separate out the free carboxyl group. There is obtained the alkali salt of the copolymer whose chain is alternately formed by the acrylic acid moiety and the olefin monomer. The degree of decarboxylation can be determined by measuring the acid number of the copolymer or the liberated carbon dioxide.

The carboxylic groups of the alternating chain structure copolymers obtained may be converted to esters, amides, etc. as desired. Moreover, the process permits the manufacture of copolymers whose chain structure alternatively consists of comonomers such as styrene on the one hand and of acrylic and maleic anhydride (the latter being present in any desired ratio) on the other merely stopping the decarboxylation when the desired acrylic-maleic acid ratio is reached.

The following chemical equations further illustrate the process of the invention utilizing styrene, maleic anhydride, sodium hydroxide and aqueous hydrochloric acid.

(1) 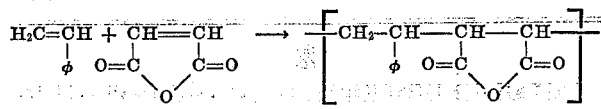

(2) 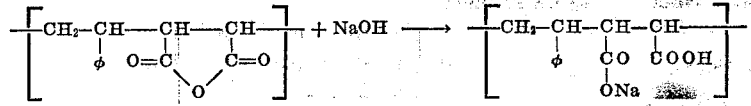

(3) 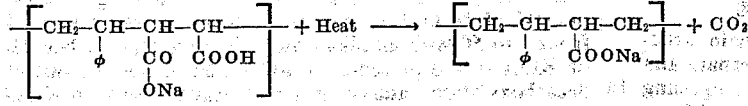

(4) 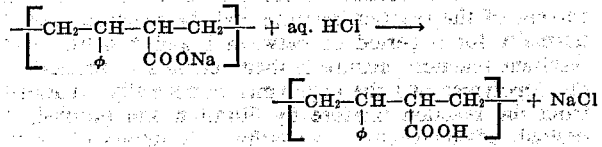

It is particularly surprising in the process of the invention that the decarboxylation of the copolymers is effected at relatively low temperatures without catalyst, at 100% conversion.

The product and process of the invention are illustrated by the following examples but are not to be construed as limitations thereof.

EXAMPLE I

An amount of 301 parts by weight of maleic anhydride-styrene copolymer, having an acid number of 496 (mg. KOH/g. polymer and a K-value of 15), and 54 parts by weight of sodium hydroxide are dissolved in 700 parts by weight of water. The solution is heated in an autoclave to 160° C. during 5 hours. A sample taken after 4.5 hours shows a 90 percent decarboxylation. Upon cooling and acidification with 1000 mls. dilute (8 wt. percent HCl in water) hydrochloric acid, the free acid of the decarboxylated polymers is precipitated. It is then separated by filtration, washed with 5000 mls. of water and dried. There was obtained 259 parts by weight of a pulverulent polymer which corresponds to a yield of 93.5% of theory having an acid number of 280 and a degree of decarboxylation to the acrylic acid-styrene copolymer of 95 percent.

EXAMPLE II

An amount of 85 parts by weight of a maleic acid/isobutylene copolymer (acid number 630; K-value 31) and 19 parts by weight of sodium hydroxide dissolved in 2000 parts by weight of water. This solution is heated in an autoclave to 160° C. during 5 hours. A sample taken after 4.5 hours showed 98.5% decarboxylation to the acrylic acid-isobutylene copolymer. Upon cooling an acidification of the solution with 300 ml. of 8 wt. percent hydrochloric acid the copolymer is precipitated and washed with 2000 mls. of water. The purified precipitate in an amount of 69 parts by weight of pulverulent product was recovered corresponding to a 95% yield of acrylic acid-styrene copolymer with an acid number of 360 corresponding to 100 percent decarboxylation of the maleic moiety to the acrylic moiety.

We claim:

1. A process for the manufacture of copolymer whose chains alternately consist of an olefin moiety and an acrylic acid moiety comprising contacting a maleic anhydride-olefin copolymer characterized by the formula:

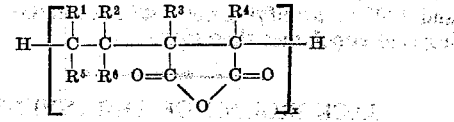

where $R^1$, $R^2$, $R^3$, $R^4$, $R^5$ and $R^6$ are hydrogen, alkyl or aryl of from 1 to 8 carbons, $x$ is an integer of from 5 to 50 with an alkali metal hydroxide utilizing a mole ratio of alkali metal hydroxide to maleic acid moiety of about 1:1 in the presence of between about 10–50 wt. percent water based on the reaction mixture in the absence of decarboxylation catalyst at a temperature between about 120° and 300° C. to form an intermediate alkali metal copolymer salt and subsequently acidifying said salt and recovering said acrylic acid-olefin copolymer from the acidified mixture characterized by the formula:

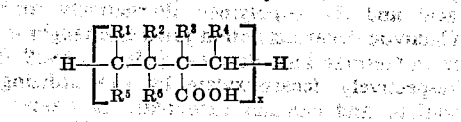

where $R^1$, $R^2$, $R^3$, $R^4$, $R^5$, $R^6$ and $x$ are as heretofore defined.

2. A process in accordance with claim 1 wherein said $R^3$ and $R^4$ are hydrogen.

3. A process in accordance with claim 2 wherein said alkali metal hydroxide is sodium hydroxide, and said acidifying comprises contacting said intermediate copolymer alkali metal salt with aqueous mineral acid of between about 2 and 10 wt. percent concentration.

4. A process in accordance with claim 3 wherein said mineral acid is hydrochloric acid, $R^1$, $R^3$, $R^4$, $R^5$ and $R^6$ are hydrogen and $R^2$ is phenyl.

5. A process in accordance with claim 3 wherein said mineral acid is hydrochloric acid and said $R^1$, $R^3$, $R^4$ and $R^5$ are hydrogen and $R^2$ and $R^6$ are methyl.

6. A copolymer product whose chains alternately consist of an olefin moiety and an acrylic acid moiety characterized by the formula:

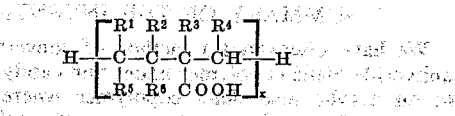

where $R^1$, $R^2$, $R^3$, $R^4$, $R^5$ and $R^6$ are hydrogen, alkyl or aryl of from 1 to 8 carbons and $x$ is an integer of from 5 to 50.

7. A copolymer product in accordance with claim 6 wherein said $R^1$, $R^3$, $R^4$, $R^5$ and $R^6$ are hydrogen and $R^2$ is phenyl.

8. A product copolymer in accordance with claim 6 wherein $R^1$, $R^3$, $R^4$ and $R^5$ are hydrogen and $R^2$ and $R^6$ are methyl.

References Cited

UNITED STATES PATENTS

| | | | |
|---|---|---|---|
| 3,444,143 | 5/1969 | Morris et al. | 260—78.4 |
| 3,297,657 | 1/1967 | Gray et al. | 260—78.5 |
| 3,180,843 | 4/1965 | Dickerson | 260—30.6 |
| 3,557,070 | 1/1971 | Anspon et al. | 260—86.7 |

JOSEPH L. SCHOFER, Primary Examiner

J. KIGHT III, Assistant Examiner

U.S. Cl. X.R.

260—80 P, M, 88.1 PC

PO-1050
(5/69)

UNITED STATES PATENT OFFICE
CERTIFICATE OF CORRECTION

Patent No. 3,682,868          Dated August 8, 1972

Inventor(s) JOHANNES WOLLNER, WOLFGANG TIETZ, WILHELM NEIER

It is certified that error appears in the above-identified patent and that said Letters Patent are hereby corrected as shown below:

Column 1, lines 5-6, change "A. G. Rheinpreussen" to

--Deutsche Texaco Aktiengesellschaft--.

Signed and sealed this 26th day of November 1974.

(SEAL)
Attest:

McCOY M. GIBSON JR.
Attesting Officer

C. MARSHALL DANN
Commissioner of Patents